United States Patent [19]

Williams

[11] 4,327,828
[45] May 4, 1982

[54] WEAR PLATE AND CORNER WHEEL MOUNTING ARRANGEMENT FOR AUTOMATED ANIMAL FEED CONVEYORS

[75] Inventor: William R. Williams, Roswell, Ga.

[73] Assignee: U.S. Industries, Inc., New York, N.Y.

[21] Appl. No.: 226,403

[22] Filed: Jan. 19, 1981

[51] Int. Cl.³ .............................................. B65G 19/18
[52] U.S. Cl. ............................... 198/729; 119/51 CF; 119/52 AF; 198/842; 198/735; 198/841
[58] Field of Search ....................... 119/51 CF, 52 AF; 198/729, 733, 735, 841, 842

[56] References Cited

U.S. PATENT DOCUMENTS

| | | | |
|---|---|---|---|
| 2,672,059 | 3/1954 | Graetz et al. | 74/248 |
| 3,147,853 | 9/1964 | Van Huis | 198/204 |
| 3,444,986 | 5/1969 | Van Huis | 198/58 |

OTHER PUBLICATIONS

Big Dutchman Instruction Manual No. 10-BK-0005, 4-1979.
Brochure entitled "Heavy Breeder Feeding System-Reliable Feed Distribution for Controlled Feeding Programs", Cyclone International, Inc., 1980.

*Primary Examiner*—Hugh R. Chamblee
*Attorney, Agent, or Firm*—Price, Heneveld, Huizenga & Cooper

[57] ABSTRACT

Corner units for automated animal feed conveyors and the like include a wheel about which a feed carrier, such as an endless chain or belt, is guided. A wear plate and wheel mounting arrangement for such corner units comprises a wear plate having a generally regular shape with a geometric center supported on the base of the unit housing adjacent the corner thereof. A spindle rotatably mounts the wheel thereon, and is attached to the wear plate at a location eccentric to the geometric center of the wear plate, whereby rotation of the wear plate about its geometric center with respect to the housing base shifts the wheel between a first position wherein a narrow feed carrier is centered in the housing and a second position wherein a wider feed carrier is centered in the housing. Fasteners rigidly attach the wear plate to the housing base in one of the positions selected in accordance with the width of the feed carrier, thereby adapting the housing for conversion to use either narrow or wide feed conveyors.

19 Claims, 9 Drawing Figures

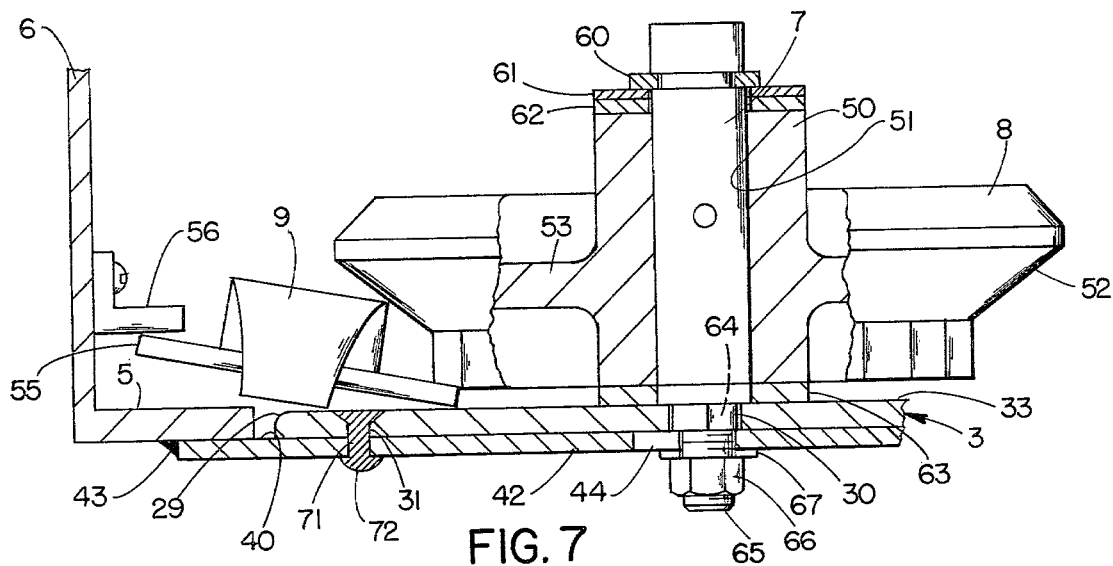

WEAR PLATE AND CORNER WHEEL MOUNTING ARRANGEMENT FOR AUTOMATED ANIMAL FEED CONVEYORS

BACKGROUND OF THE INVENTION

The present invention relates to automated animal feed systems, and in particular to a wear plate and wheel mounting arrangement for feed conveyor corner units.

Automated animal feed systems, such as for poultry and the like, typically include feed conveyors which are located on at least one side of each tier or battery of confinement cages, and automatically transport feed from a central storage area to an open trough disposed along the cages. A conveyor loop is provided for each tier of cages, and comprises interconnected trough sections in which an endless carrier, such as a drag chain or conveyor belt, is transported. The conveyor loops are typically arranged in a generally rectangular or polygon configuration, with a mechanism positioned at each corner of the conveyor to guide the feed carrier around the corner.

In rectangular conveyor arrangements, a chain circuit corner or post assembly is provided at three corners of the conveyor, and a corner feeder is located at the fourth corner to add fresh, make-up feed to the conveyor. As taught by U.S. Pat. No. 3,444,986, in recent years each such corner unit preferably locates an idler wheel inside the hopper about which the feed chain rides to change its direction of travel. A wear plate is located beneath the idler wheel over which the chain rides as it is guided by the wheel.

Different width feed chains and conveyor troughs are used in poultry feed conveyors in accordance with the size of the system. For example, in very large confinement systems, a wide feed chain, in the nature of 2¾ inches is used with similarly sized conveyor troughs to insure that adequate feed is available to the animals along the entire length of the conveyor. For smaller confinement systems, conveyors with a chain width in the nature of two inches provide a sufficient flow of feed to the cages.

Heretofore, two separate corner units have been required to accommodate wide and narrow feed conveyors. This is a quite expensive construction technique, particularly with respect to the corner units as a result of their rather complex design. Assembly time, inventory costs, handling expenses, and assembly overhead costs are all increased as a result of the requirement for two or more different size conveyors.

SUMMARY OF THE INVENTION

One aspect of the present invention is to provide a corner hopper unit for automated animal feed conveyors having an improved wear plate and wheel mounting arrangement. A wear plate, having a generally regular shape with a geometric center, is supported on the base of the housing adjacent the corner area thereof. A spindle rotatably mounts the wheel thereon and is attached to the wear plate at a location eccentric to the geometric center of the wear plate. Rotation of the wear plate about its geometric center with respect to the housing base shifts the wheel between a first position wherein a narrow feed conveyor is centered in the housing, and a second position wherein a wider feed carrier is centered in the housing. Fasteners or other means rigidly attach the wear plate to the housing base in one of the positions as selected in accordance with the width of the feed carrier, thereby adapting the housing for use with both narrow and wide feed conveyors. An adapter is mounted in the inlet side of the corner feeders to insure proper metering of the feed onto the feed carrier.

The wear plate and wheel mounting arrangement makes possible the use of the same components for constructing a hopper for a selected one of a number of different widths of conveyors. In other words, the same components used in a hopper for one width of conveyor can be used for converting the hopper for a different width of conveyor. The assembly is easy to assemble, and provides a very sturdy, durable construction, capable of a long operating life. Further, the assembly reduces fabrication costs, provides assembly efficiency, and is particularly well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 7 is a fragmentary, vertical cross-sectional view of the corner unit, with portions thereof broken away to reveal internal construction.

FIG. 8 is an exploded, perspective view of the corner unit, with the wear plate shown disassembled for illustrative purposes.

FIG. 9 is an exploded, perspective view of an adapter for the corner unit to facilitate use with narrow feed chains.

DETAILED DESCRIPTION OF THE PREFERRED EMBODIMENTS

Figure 1:
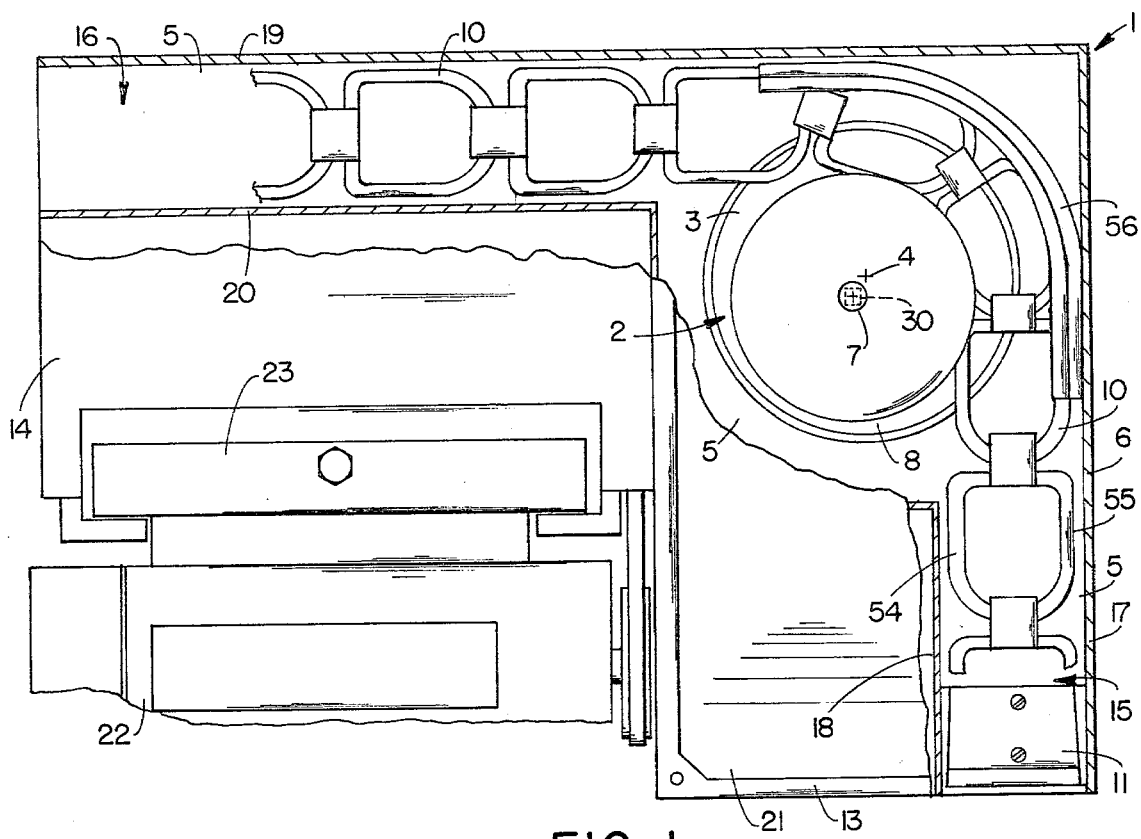
FIG. 1 is a top plan view of a corner unit, with portions thereof broken away to reveal a wear plate and corner wheel mounting arrangement embodying the present invention, shown with a wide feed chain mounted therein.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

Reference numeral 1 (FIG. 1) generally designates a corner unit for automated animal feed conveyors, and the like, having a wear plate and corner wheel mounting arrangement 2 embodying the present invention. A wear plate 3 having a generally regular shape with a geometric center 4 is supported on the base 5 of housing 6 adjacent the corner area thereof. A spindle 7 rotatably mounts idler wheel 8 thereon, and is attached to wear plate 3 at a location eccentric to the geometric center 4 of the wear plate. Rotation of wear plate 3 about its geometric center 4 with respect to housing base 5 shifts wheel 8 between a first position (FIG. 2) wherein a narrow feed carrier 9 is centered in housing 6, and a second position (FIG. 1) wherein a wider feed carrier 10 is centered in housing 6.

The illustrated corner unit 1 is a corner feeder for automated poultry systems having a substantially conventional construction, with the exception of wear plate and wheel mounting arrangement 2. Corner feeder 1 is substantially similar to the corner unit disclosed in Big Dutchman Instruction Manual No. 10-BK-0005, which is hereby incorporated by reference, and includes an L-shaped housing having two rectangular portions 13 and 14, with an inlet chute 15 on the return side of housing 6, and an outlet chute 16 on the opposite side of the housing. Inlet chute 15 is defined by housing sidewalls 17 and 18, in conjunction with base 5, and outlet chute 17 is defined by housing sidewalls 19 and 20 in conjunction with base 5. Each pair of chute sidewalls 17–18 and 19–20 are spaced apart a distance wide enough to slidingly receive the wide feed chain 10 through both chutes. A hopper 21 is located in the inlet side 13 of housing 6, and meters fresh, make-up feed onto the chain conveyor 9 or 10. A drive motor 22 is attached to the outlet side 14 of housing 6 by a mount 23, and powers the chain in a conventional fashion. A foot 11 is mounted in the entrance to inlet chute 15 and guides chain 10 into the corner feeder.

Although the wear plate and corner wheel mounting arrangement 2 is shown herein attached to a corner feeder, it is to be understood that the present invention may be used in conjunction with other types of corner units, such as the corner post assembly disclosed in U.S. Pat. No. 3,147,853 to Van Huis, which is hereby incorporated by reference.

The illustrated feed chains 9 and 10 are of a conventional construction, such as the structure disclosed in U.S. Pat. No. 2,672,059 to Graetz et al, which is hereby incorporated by reference.

Figures 5, 6:
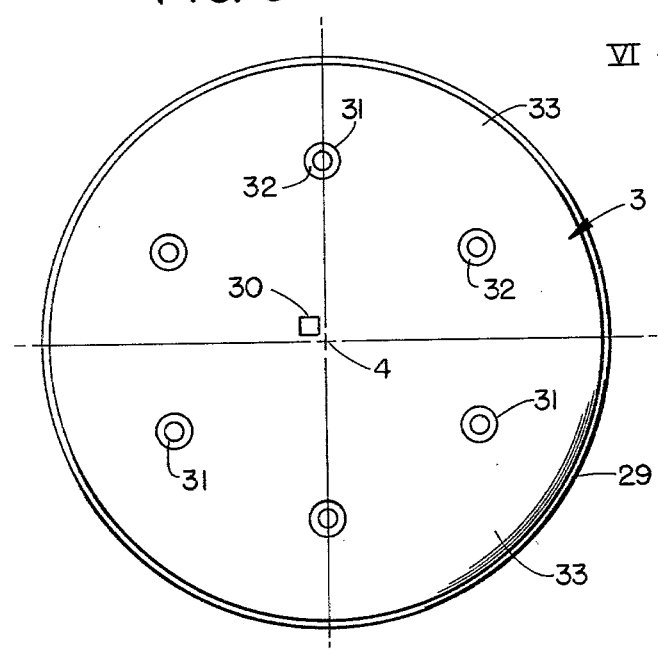
FIG. 5 is a top plan view of the wear plate.
FIG. 6 is a side elevational view of the wear plate.

With reference to FIGS. 5 and 6, wear plate 3 has a generally regular shape with a geometric center 4. Wear plate 3 may be of various shapes, including regular polygons such as square, rectangular, octagonal, etc., as well as elliptical and the like, so long as the shape is symmetrical about its longitudinal axis, and can be rotated 180° between the two conveyor chain positions. In this example, wear plate 3 is disc-shaped, with a circular plan shape, and a beveled or chamfered upper edge 29. Wear plate 3 is constructed of a strong, durable antifriction material, such as a case hardened steel. An aperture 30 is disposed through wear plate 3 at a location eccentric to the geometric center 4 of the plate. Aperture 30 preferably has a noncircular plan shape to facilitate attachment of spindle 7 to the wear plate, as described in greater detail hereinafter. In this example, aperture 30 has a square shape, with its center offset from the geometric center 4 of wear plate 3 a distance in the nature of 3/16–¼ inches. Fastener apertures 31 are provided in wear plate 3 for attaching the wear plate to base plate 42, and are preferably disposed equidistantly from the geometric center 4 of the wear plate in a regularly spaced pattern. The illustrated fastener apertures 31 are arranged in a circular pattern on wear plate 3, and have an enlarged, frustoconically-shaped upper portion 32 which is adapted to receive the head of a mating, countersunk fastener therein. The upper and lower surfaces 33 and 34 of wear plate 3 are substantially flat and parallel, with at least the upper surface being hardened or otherwise adapted to resist wear. The diameter of wear plate 3 is selected so that it is wide enough for operative contact with both feed chains 9 and 10.

Figures 3, 4:
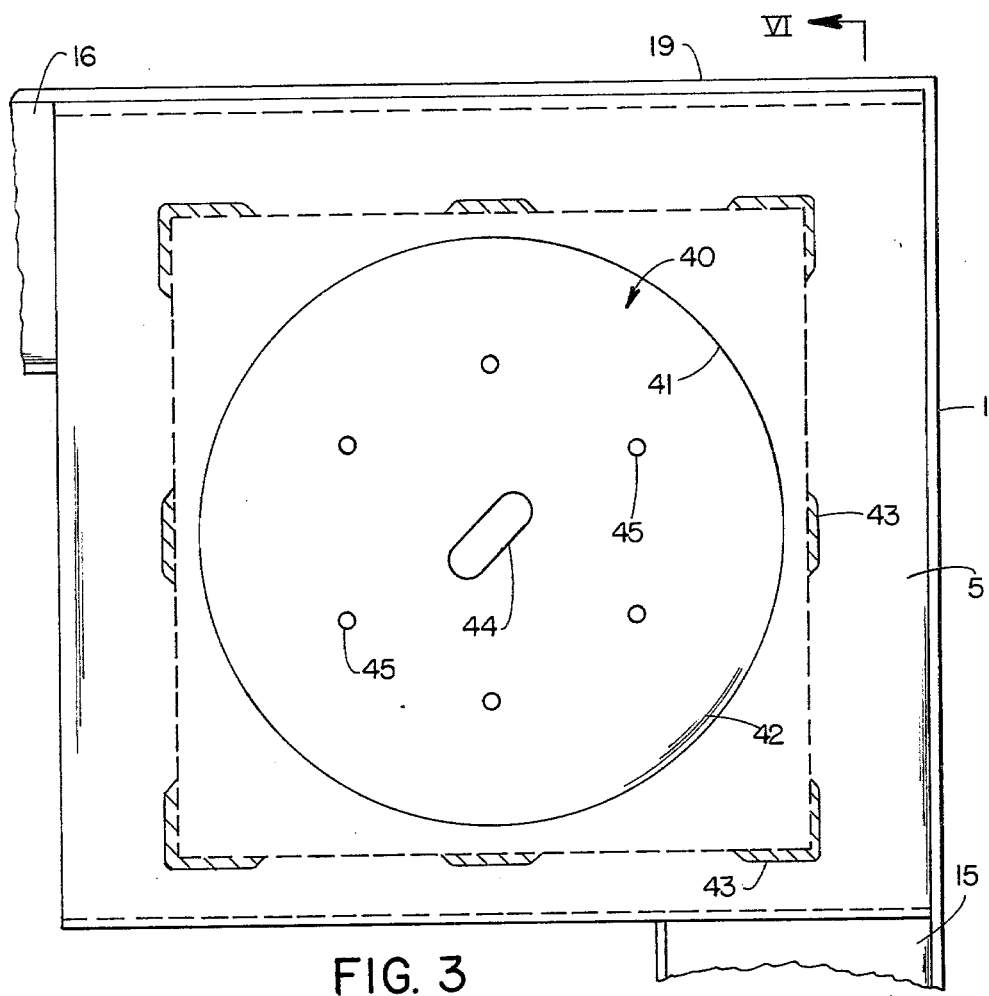
FIG. 3 is a top plan view of a base plate portion of the corner unit.
FIG. 4 is a vertical cross-sectional view of the base plate, taken along the line IV—IV, FIG. 3.

With reference to FIGS. 3 and 4, housing base 5 preferably includes a recess 40 which is shaped to matingly receive wear plate 3 therein. In this example, recess 40 comprises a circular aperture 41 through housing base 5, with a base plate 42 fixedly attached to the lower surface thereof under aperture 41 by means such as welds 43. Base plate 42 includes an elongate slot 44 therethrough, which extends on either side of the center of the base plate. Slot 44 has a lateral width substantially commensurate with the width of wear plate aperture 30, and is preferably oriented along an imaginary line which bisects the corner of the housing defined by the intersection of housing sidewalls 17 and 19 for purposes to be described in greater detail hereinafter. The length of slot 44 is slightly greater than twice the distance between the geometric center 4 of wear plate 3 and the center of wear plate aperture 30. Six fastener apertures 45 are provided in base plate 42, and are arranged equidistantly from the center thereof in a circular pattern, such that they are vertically aligned with the six fastener apertures 31 in wear plate 3. Because both sets of apertures 45 and 32 are circumferentially spaced in a regular fashion, all of the apertures will align when wear plate 3 is rotated at intervals of 60° with respect to housing base 5. The depth of recess 40 is substantially commensurate with the thickness of wear plate 3, such that the upper surface 33 of wear plate 3 is flush or coplanar with the upper surface of housing base 5 when the two members are assembled. The center of slot 44 is preferably located with respect to housing 6, such that it is equidistant from both housing sidewalls 17 and 19.

With reference to FIG. 7, corner wheel 8 has a substantially conventional construction, and includes a central hub 50 with an axially disposed aperture 51 through which spindle 7 extends. Wheel 8 includes a circumferential surface or rim 52 connected with hub 50 by web 53. The lower portion of rim 52 is beveled or inclined downwardly with vertical notches 54 at its base to engage the interior edge 54 of feed chains 9 and 10. As the feed chain is guided about wheel 8, the exterior edge 55 of the chain tends to rise upwardly and engages an arcuately-shaped hold-down rail or stop 56. The interior edge 54 of chain 9 abuts the upper surface of wear plate 3 and glides thereover as the chain moves about wheel 8. It is this rubbing action which necessitates the existence of wear plate 3, so as to avoid damage to either the chain or the corner feeder housing. The lower flange of stop 56 is sized so that it is sufficiently wide to engage both the narrow and wide feed chains 9 and 10.

In the illustrated example, wheel 8 is mounted in housing 6 in one of two positions, as selected in accordance with the width of the conveyor and feed chain to be used. As best illustrated in FIG. 7, spindle 7 has a snap ring 60 mounted at its upper end, with a pair of anti-friction washers 60 and 61 positioned between snap ring 60 and the upper surface of wheel hub 50. A third anti-friction washer 63 is mounted on spindle 7 between the lower surface of wheel hub 50 and the upper surface of wear plate 3. The lower end of spindle 7 includes a collar 64, having a noncircular transverse cross-sectional shape which mates with the shape of wear plate aperture 30 for telescoping reception therein. The terminal end 65 of spindle 7 is threaded, extends through slot 44 in base plate 42, and includes a nut 66 and washer 67 mounted on that portion of the threaded end which extends through base plate 42. The tightening of nut 66 not only attaches wheel 8 to wear plate 3, but also assists in fastening wear plate 3 to base plate 42. The square-shaped collar 64 and mating wear plate aperture 30 prevent spindle 7 from rotating with respect to wear plate 3 and housing 6.

The mounting of corner wheel 8 in housing 6 during the fabrication of the corner unit 1 is accomplished in the following manner. If the corner unit 1 is to be used in conjunction with the wide feed chain 10 (FIG. 1), wear plate 3 is inserted into the recess 40 of base plate 42 in a manner such that wear plate aperture 30 (FIGS. 3 and 5) is disposed down and to the left of the center of slot 44, as viewed in FIGS. 3 and 5. In other words, the center of wear plate aperture 30 is positioned furthest away from the sidewalls 17 and 19 of housing 6, and away from hold-down rail 56. Wear plate 3 can be rotated in recess 40 until this position is achieved, and so as to align fastener apertures 32 and 45. Fasteners, such as rivets 71 (FIG. 7) are then inserted through each pair of apertures 42 and 45, and the rivets are set forming heads 72 to securely anchor wear plate 3 in housing 6. Spindle 7, with wheel 8 assembled thereon, is then positioned over wear plate 3, with the lower end 65 of the spindle inserted through wear plate aperture 30 and base plate slot 44. The square spindle collar 64 is aligned with the square base plate aperture 30, so that it is received matingly therein. Washer 67 and nut 66 are then assembled onto the threaded end of spindle 7 and tightened. The ledge disposed above collar 64 on spindle 7 provides proper clearance between snap ring 60 and wheel 8 to insure smooth, free rotation of wheel 8. In this position, wheel 8 is located so that the wide feed chain 10 is centered in inlet and outlet chutes 15 and 16 respectively, as shown in FIG. 1.

Figure 2:
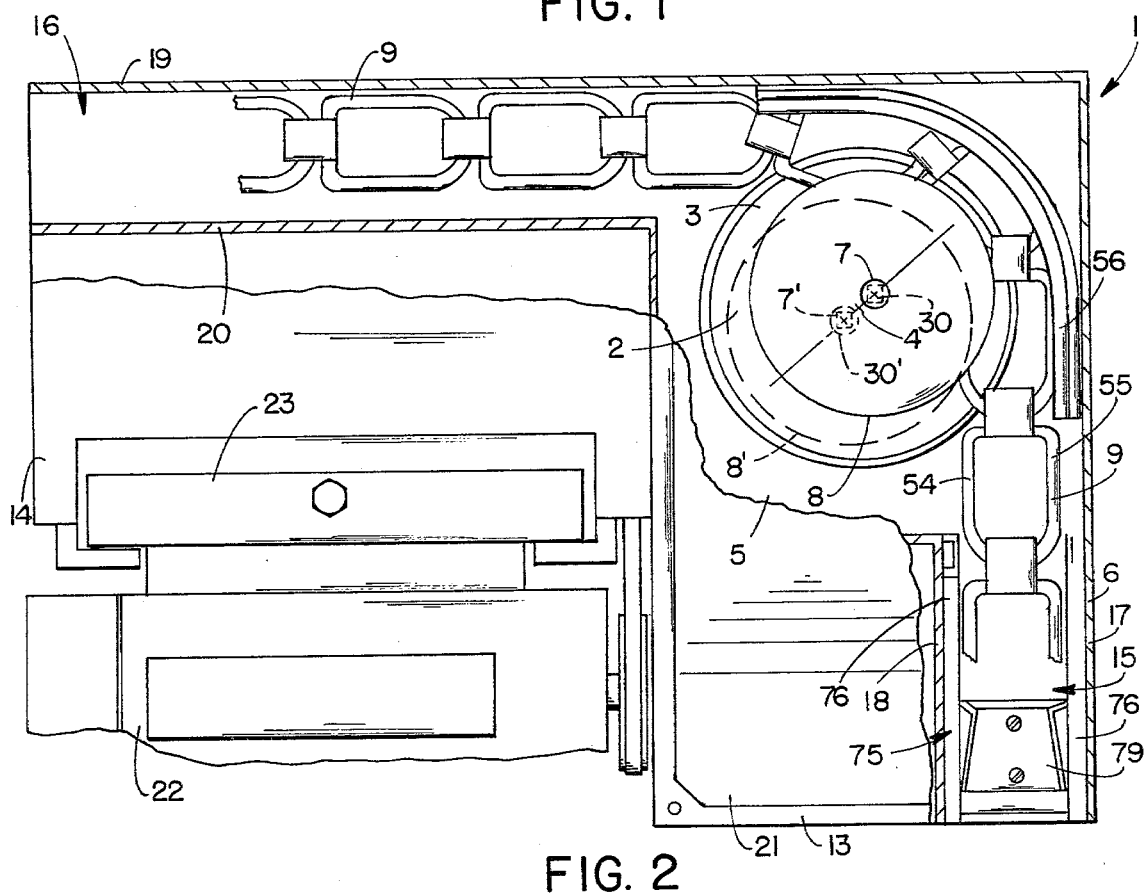
FIG. 2 is a top plan view of the corner unit illustrated in FIG. 1, broken away to show the wear plate and corner wheel mounting arrangement, and shown with a narrow feed chain mounted therein.

To assemble corner wheel 8 in housing 6 for use with the narrow feed chain 9 (FIG. 2), wear plate 3 is rotated with respect to base plate 42 in a manner so that wear plate aperture 30 is located above and to the right of the center of slot 44, as viewed in FIG. 3. In other words, wear plate aperture 30 is located closest to housing sidewalls 17 and 19, toward hold-down rail 56. The wear plate and base plate apertures 31 and 45 are then aligned, and rivets 71 set in place. The spindle 7 and wheel 8 are then attached to wear plate 3 and base plate 42 in a manner substantially identical to that described above. In this position, wheel 8 centers the narrow feed chain 9 in the inlet and outlet chutes 15 and 16 respectively, as shown in FIG. 2. The broken lines appearing in FIG. 2 schematically illustrate the position of wheel 8 and spindle 7 in the wide chain position, and are referenced herein by the numerals 8' and 7' respectively. Because the size of wear plate 3 and chain stop 56 have been specially selected, they will properly engage either the wide chain 10 or the narrow chain 9, and retain the chain in a substantially horizontal orientation as the chain is guided over wheel 8.

When corner unit 1 has been assembled for use in conjunction with the narrow feed chain 9, an adapter 75 (FIGS. 2 and 9) is installed in inlet chute 15 to insure that the distance between the side edges 54 and 55 of feed chain 9 and the sides of chute 15 is sufficiently small to permit a controlled flow of fresh, make-up feed onto the feed chain. In the example illustrated in FIG. 9, adapter 75 comprises a pair of U-shaped channels 76 which are attached to either side of the inlet chute sidewalls 17 and 18. Each of the channels 76 includes a transversely extending aperture 77 therethrough through which an axle 78 is received for mounting a feed remix wheel (not shown) thereon. An alternate foot 79 is positioned between adapter channels 76 at the entrance of inlet chute 15 in lieu of foot 11 for guiding the narrow feed chain 10 into the corner feeder 1.

The wear plate and wheel mounting arrangement 2 provides a very economical means by which a single corner unit, such as corner feeder 1, can be used in animal feed systems with either a wide or narrow conveyor arrangement, thereby greatly reducing fabrication costs, inventory expenses, and other related costs. The mounting procedure preferably takes place in the assembly area of manufacture, thereby alleviating the overhead costs associated with stocking two types of corner units. Further, the mounting arrangement is quite easy to assemble, and provides a very sturdy, durable construction.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. In a corner unit for automated animal feed conveyors and the like, comprising a housing including a corner with means supporting a wheel spaced from the walls of said corner and about which an endless feed carrier is guided between said wheel and said walls, the improvement of a wear plate and wheel mounting arrangement, comprising:

a wear plate having a generally regular shape with a geometric center;

a housing base adapted for supporting said wear plate thereon adjacent the walls and a corner area of said base;

a spindle rotatably mounting said wheel thereon;

means for mounting said spindle on said wear plate at a location eccentric to the geometric center of said wear plate, whereby rotation of said wear plate about its geometric center with respect to said housing base shifts said wheel between a first position spaced from said walls for accommodating a narrow feed carrier between said walls and said wheel, and a second position wherein a wider feed carrier can be accommodated between said walls and said wheel; and means for rigidly attaching said wear plate to said housing base in one of said first and second positions as selected in accordance with the width of said feed carrier, thereby adapting said housing for use with either a narrow or a wide feed carrier.

2. A corner unit as set forth in claim 1, wherein:

said housing base includes a recess shaped to receive said wear plate therein; said recess having a depth substantially commensurate with the thickness of said wear plate, whereby the upper surface of said wear plate is positioned generally flush with the upper surface of said housing base.

3. A corner unit as set forth in claim 2, wherein:

said recess is defined by an aperture extending through said housing base with a base plate fixedly attached to the lower surface of said housing base and positioned below said aperture.

4. A corner unit as set forth in claim 3, wherein said wear plate attaching means comprises:
   a plurality of apertures extending through said wear plate and disposed equidistantly from the geometric center of said wear plate in a regularly spaced pattern;
   a plurality of apertures extending through said base plate and aligned with said wear plate apertures; and
   fasteners extending through said wear plate and base plate apertures, and selectively interconnecting said wear and base plate in one of said first and second positions.

5. A corner unit as set forth in claim 4, wherein:
   said fasteners comprise rivets with countersunk heads.

6. A corner unit as set forth in claim 4, wherein said spindle mounting means comprises:
   an elongate slot extending through a center area of said base plate, adapted to receive a lower end of said spindle therethrough, and having a longitudinal axis disposed along an imaginary line which bisects said corner area of said housing base.

7. A corner unit as set forth in claim 6, wherein said spindle mounting means further comprises:
   an aperture extending through a center area of said wear plate, and having a noncircular plan shape;
   a collar on the lower end of said spindle, having a noncircular shape which mates with the noncircular wear plate aperture and is received therein; and
   a fastener attached to the lower end of said spindle at that portion thereof which extends through said base plate central aperture, thereby further interconnecting said wear and base plates.

8. A corner unit as set forth in claim 7, wherein:
   said noncircular aperture in said wear plate and said mating spindle collar have a square shape.

9. A corner unit as set forth in claim 7, wherein:
   said spindle end portion is threaded; and
   said fastener comprises a nut.

10. A corner unit as set forth in claim 9, wherein:
    said wear plate and said recess have a substantially circular plan shape.

11. A corner unit as set forth in claim 10, wherein:
    said wear plate has an upper, circumferential edge which is chamfered.

12. A corner unit as set forth in claim 1, wherein said wear plate attaching means comprises:
    a plurality of apertures extending through said wear plate, and disposed equidistantly from the geometric center of said wear plate in a regularly spaced pattern;
    a plurality of apertures extending through said base plate and aligned with said wear plate apertures; and
    fasteners extending through said wear plate and base plate apertures, and selectively interconnecting said wear and base plates in one of said first and second positions.

13. A corner unit as set forth in claim 1, wherein said spindle mounting means comprises:
    an elongate slot extending through a center area of said base plate, adapted to receive a lower end of said spindle therethrough, and having a longitudinal axis disposed along an imaginary line which bisects said corner area of said housing base.

14. A corner unit as set forth in claim 13, wherein said spindle mounting means further comprises:
    an aperture extending through a center area of said wear plate, and having a noncircular plan shape;
    a collar on the lower end of said spindle, having a noncircular shape which mates with the noncircular wear plate aperture and is received therein; and
    a fastener attached to the lower end of said spindle at that portion thereof which extends through said base plate central aperture, thereby further interconnecting said wear and base plates.

15. A corner unit as set forth in claim 1, wherein:
    said wear plate has a substantially circular plan shape.

16. In a corner hopper for automated poultry systems and the like, comprising a housing having mutually perpendicular inlet and outlet openings through which a feed chain is conveyed along an arcuate path when passing from said inlet opening to said outlet opening; and a wheel located in a corner area of said hopper about which wheel said feed chain is guided, the improvement of a wear plate and wheel mounting arrangement, comprising:
    a wear plate having a generally regular shape with a geometric center;
    a housing base adapted for supporting said wear plate thereon in said corner area;
    a spindle rotatably mounting said wheel thereon;
    means for mounting said spindle on said wear plate at a location eccentric to the geometric center of said wear plate, whereby rotation of said wear plate about its geometric center with respect to said housing base shifts said wheel between a first position and a second position for guiding a narrow feed chain when in said first position and a wide feed chain when in said second position; and
    means for rigidly attaching said wear plate to said housing base in one of said first and second positions as selected in accordance with the width of said feed chain, thereby adapting said housing for use with either narrow or wide feed chains.

17. A corner hopper as set forth in claim 16, wherein:
    said wear plate is mounted in said housing at a location, whereby shifting said wear plate between said first and second positions automatically centers said narrow and wide feed chains along said arcuate path.

18. A corner hopper as set forth in claim 17, including:
    an adapter shaped for positioning in said inlet opening when the narrow feed chain is used; said adapter including sidewalls disposed between the side edges of said feed chain and the sides of said inlet opening for reducing the space therebetween to an amount which permits a controlled flow of fresh feed onto the feed chain.

19. A corner hopper as set forth in claim 18, wherein said adapter includes:
    an alternate foot disposed between said adapter sidewalls at the entrance to said inlet chute for guiding the narrow feed chain into said corner feeder.

* * * * *

UNITED STATES PATENT AND TRADEMARK OFFICE
CERTIFICATE OF CORRECTION

PATENT NO. : 4,327,828
DATED : May 4, 1982
INVENTOR(S) : William R. Williams

It is certified that error appears in the above—identified patent and that said Letters Patent is hereby corrected as shown below:

Column 3, line 18:
"chute 17" should be --chute 16--

Column 4, line 60:
"washers 60 and 61" should be --washers 61 and 62--

Signed and Sealed this

Seventeenth Day of August 1982

[SEAL]

Attest:

GERALD J. MOSSINGHOFF

Attesting Officer    Commissioner of Patents and Trademarks